US007480668B2

(12) United States Patent
Utsui

(10) Patent No.: US 7,480,668 B2
(45) Date of Patent: Jan. 20, 2009

(54) ADDRESS DATABASE AND ADDRESS RETRIEVAL SYSTEM USING THE SAME

(75) Inventor: Yoshihiko Utsui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 400 days.

(21) Appl. No.: 11/069,566

(22) Filed: Mar. 2, 2005

(65) Prior Publication Data
US 2005/0234970 A1 Oct. 20, 2005

(30) Foreign Application Priority Data
Apr. 15, 2004 (JP) ............... 2004-120623

(51) Int. Cl.
G06F 7/00 (2006.01)
G06F 17/00 (2006.01)
G06F 12/00 (2006.01)
G06F 17/30 (2006.01)

(52) U.S. Cl. .................. 707/101; 707/102; 707/200
(58) Field of Classification Search ................ 707/101
See application file for complete search history.

(56) References Cited

U.S. PATENT DOCUMENTS

| 4,862,392 | A | * | 8/1989 | Steiner | 345/427 |
| 5,941,930 | A | * | 8/1999 | Morimoto et al. | 701/201 |
| 7,240,008 | B2 | * | 7/2007 | Hitotsumatsu | 704/275 |
| 2001/0020213 | A1 | * | 9/2001 | Hatano | 701/207 |
| 2005/0251325 | A1 | * | 11/2005 | Kudo et al. | 701/200 |

FOREIGN PATENT DOCUMENTS

| JP | 3267202 B2 | 1/2002 |
| JP | 2003-186880 A | 7/2003 |

OTHER PUBLICATIONS

XML for Analysis Specification Version 1.0. Microsoft Corporation and Hyperion Solutions Corporation. Last Updated Apr. 24, 2001. 107 pages. http://www.xmla.org/download.asp?id=2.
Decision Support Objects. Microsoft Corporation. Last viewed on Jun. 27, 2005. 1 page. http://msdn.microsoft.com/library/default.asp?url=/library/en-us/olapdmpr/prabout_84a4.asp.
Joshi et al., "The Inverted Pyramid Approach in User Interface Design for Interactive Information Retrieval," EASY3 (CHI South India) annual conference, Mar. 2003.
Guttman, "R-Trees a Dynamic Index Strcture for Spatial Searching," University of California, Berkeley, pp. 47-57.

* cited by examiner

*Primary Examiner*—Pierre M. Vital
*Assistant Examiner*—Vu John Ha
(74) *Attorney, Agent, or Firm*—Birch, Stewart, Kolasch & Birch, LLP

(57) ABSTRACT

An address retrieval system includes: an address database having a tree structure in which regional names, which constitute an address, and which indicate the areas of each scale ranging from the large area down to the small area, are associated with nodes, wherein a child node has a regional name indicating an area that is larger than the area indicated by the regional name owned by its parent node; an input portion that inputs the regional names; a central processor that searches the address database for the child node having the regional name inputted by the input portion as its parent node; and an output portion that outputs the regional name corresponding to the child node retrieved by the central processor.

14 Claims, 14 Drawing Sheets

FIG.6

| ADDRESS RETRIEVAL | KITANO-CHO, CHUO-KU, KOBE CITY, HYOGO PREFECTURE | RETURN |

1-CHOME (KITANO-DORI)

2-CHOME (IJINKAN)

3-CHOME (TEDDY BEAR MUSEUM)

4-CHOME

Map

ADDRESS DATABASE AND ADDRESS RETRIEVAL SYSTEM USING THE SAME

BACKGROUND OF THE INVENTION

1. Field of the Invention

The present invention relates to an address database and an address retrieval system, and more particularly relates to a technology used for rapidly retrieving a desired geographic point.

2. Description of Related Art

Conventionally, an address retrieval system retrieving a desired geographic point by using an address database has been known. The point located by this address retrieval system is used for displaying a map centering on this point, searching for a route from the current position by using the point as a destination, and furthermore, retrieving a facility located around the point.

The address database used in such an address retrieval system has a tree structure composed of a plurality of hierarchies in which regional names ranging from large-area names to small-area names such as, for example, the names of the 47 prefectures of Japan, the names of administrative wards and cities, the names of administrative wards, town or village names, area names, and block numbers are caused to correspond to nodes, and the large areas are positioned at the hierarchical upper levels. In addition, the regional names of areas that are further larger than the 47 prefectures, for example, the regional names of Tohoku district, Kanto district, and Kinki district are occasionally used as the top hierarchical level.

In conventional address retrieval systems, a desired geographic point is located by using an address database having such a tree structure and sequentially narrowing down regional names from the regional names of a large area to the names of a small area, in other words, while sequentially tracing the nodes of the address database, for example, the prefecture→the administrative ward and city→the administrative ward→the town or village→the block number in the order.

In further detail, when the system is instructed to retrieve an address, the names of the prefectures are first displayed on the screen in list form in order to select a prefecture positioned at the top hierarchical level. The user selects a desired prefecture from among the names of the 47 prefectures displayed on this screen. When the desired prefecture is selected, after that the names of the administrative wards and cities belonging to the prefecture, positioned at the second hierarchical level, are displayed on the screen. Further, in a similar manner, the nodes are sequentially interactively traced about the name of town or village, the block number (chome) and so on, and the processing reaches the hierarchical bottom, thus specifying the desired region or geographic point to be located.

To give an actual example, when "2-chome Kitano-cho, Chuo Ward, Kobe City, Hyogo Prefecture" famous for "Ijinkan (Former Residences of Early Foreign Settlers)" is retrieved, the region is narrowed down by sequentially selecting the applicable regions according to the address notation "Hyogo Prefecture → Kobe City → Chuo Ward → Kitano-cho → 2-chome" in the order.

Further, as a technology relating to the address retrieval system, for example, JP-A-2003-186880 discloses an address retrieval system giving a map of an objective address or a map of the neighborhood of an objective address even when the user inputted an incorrect retrieval address character string, which is not registered in the database. In this address retrieval system, the user inputs the address of which the map is wanted into an address-retrieving server through an information terminal. The retrieving portion searches the address database, based on the inputted retrieval address character string, for the corresponding address data. Subsequently, the address retrieval system reads out the map data associated with the retrieved address data from the map database, and provides the user with the map data. When there exists no address corresponding to the retrieval address character string inputted by the user, the system repeats the retrieval while reducing the retrieval address character string from the rear by a predetermined amount each time (for example, by one character or by one address notation unit, up to a predetermined border) until one or more addresses are hit.

Moreover, as another technology relating to the system, for example, Japanese Patent No. 3267202 discloses a navigation device used for a vehicle, which retrieves a registered geographic point such as a destination or a passing geographic point by inputting the reading of the name of the registered geographic point or the character string of the name thereof. This navigation device for a vehicle includes: an information storing means for storing information about the reading of the registered geographic points as the registered geographic point information; an input means for inputting the reading of the registered geographic points; a transforming means for transforming the reading inputted by this input means into a predetermined character string; a retrieving means for searching the registered geographic points memorized in the information storing means for a registered geographic point of the name containing the transformed character string; and a display means for displaying the retrieved registered geographic points in list form. This makes easy the retrieval by the Japanese-syllabary (Japanese-alphabetical) input, resulting in excellent user-friendliness.

However, even if the user tries to retrieve an objective geographic point, the user often has an unclear knowledge about the intermediate portion of the address notation of the point, or memorizes only the town name. Accordingly, in the address retrieval system arranged as mentioned above, in the process of interactively selecting a regional name, if there exists a regional name that the user does not know or a little knows in any hierarchical level, the processing cannot reach the hierarchical bottom or must return to the hierarchical upper level and be restarted in the case of the user's selecting an incorrect regional name. As a result, it takes much time for the processing to reach the desired geographic point.

For example, when the "Ijinkan" mentioned above is retrieved, the memorizing patterns of the address information may be as follows:

(1) Only the town name of Kitano-cho is known.
(2) The town name of Kitano-cho is known, and it is known that the town is located at Kobe City in Hyogo Pref. In such a case, in the case of the memorizing pattern (1) of the address information, for example, the first hierarchical level of "Hyogo Prefecture" cannot be selected, failing in retrieving the point. In the case of the memorizing pattern (2) of the address information, the first and second hierarchical levels of "Hyogo Prefecture" and "Kobe City" can be selected; however, the ward name, which is the third hierarchical level, cannot be selected, also failing in retrieving the point.

For this reason, countermeasures are taken to display the regional names included by the hierarchical levels in list form. However, when a wrong regional name is selected from in the list, it is necessary to examine all the regional names included by the next lower hierarchical level to thereby realize that there exist no corresponding regional names therein;

then to return to the higher level to select another regional name anew, and further, repeat a similar operation. In the above case of the memorizing pattern (2) of the address information, when the ward name, which is positioned at the third hierarchical level, is incorrectly selected, it is necessary to examine all the town names positioned in the next fourth level and thereby find that there does not exist the corresponding town name "Kitano-cho," then return to the third level to newly select another ward name, and further, repeat a similar operation.

Memorizing patterns of address information probably include not only the above cases but also the case in which only a portion of an address is a key for finding a geographic point as in the case of "Aoyama 1-chome where a certain company exists" or "somewhere at Marunouchi," for example. Therefore, there is a problem that when the user has unclear memory about an address, the user cannot retrieve the destination geographic point, or it takes much time for the user to retrieve the point.

The method of "Japanese-syllabary retrieval" performing retrieval by using only kana (the Japanese phonetic syllabaries) is known as a technique eliminating the problem of the above-described conventional address retrieval system. However, the "Japanese-syllabary retrieval" usually uses the names of facilities as the retrieval keys, and the system does not occasionally contain addresses. Moreover, even when the system contains addresses, because the number of facilities to be retrieved is tremendous, the number of characters to be inputted increases until selection from among many displayed candidates or display in list form can be performed. As a result, there is a problem that an input operation is troublesome.

SUMMARY OF THE INVENTION

The present invention has been accomplished to solve the above-mentioned problem. An object of the present invention is to provide an address database with which a destination geographic point can be rapidly retrieved by simple operations and to provide an address retrieval system using this database.

The address database in accordance with the present invention is arranged such that regional names, which constitute an address, and which indicate the areas of each scale ranging from the large area down to the small area, are associated with nodes, wherein a child node has a regional name indicating an area that is larger than the area indicated by the regional name owned by its parent node.

Further, the address retrieval system in accordance with the present invention includes: an address database having a tree structure in which regional names, which constitute an address, and which indicate the areas of each scale ranging from the large area down to the small area, are associated with nodes, wherein a child node has a regional name indicating an area that is larger than the area indicated by the regional name owned by its parent node; an input portion that inputs the regional names; a central processor that searches the address database for the child node having the regional name inputted by the input portion as its parent node; and an output portion that outputs the regional name corresponding to the child node retrieved by the central processor.

Therefore, according to the present invention, the child node is arranged to have a regional name indicating an area that is larger than the area indicated by the regional name owned by its parent node, which enables the retrieval to be started from a regional name indicating a small area, for example, from a town or village name. As a result, even when the user does not know or knows unclearly a regional name coming halfway through the address notation or knows only a famous regional name but does not know the regional name of the higher level region to which the region belongs (for example, a ward name or a city name), the user can retrieve the destination geographic point.

BRIEF DESCRIPTION OF THE DRAWINGS

FIG. 6 is a view showing an example of a dialogue used in an address retrieval system in accordance with a second embodiment of the present invention;

DETAILED DESCRIPTION OF THE PREFERRED EMBODIMENTS

An embodiment of the present invention will now be described in details by reference to the drawings. Hereinafter, the embodiment will be described by giving as an example a case where an address retrieval system of the invention is applied to a navigation device mounted on a vehicle.

Embodiment 1

Figure 1:
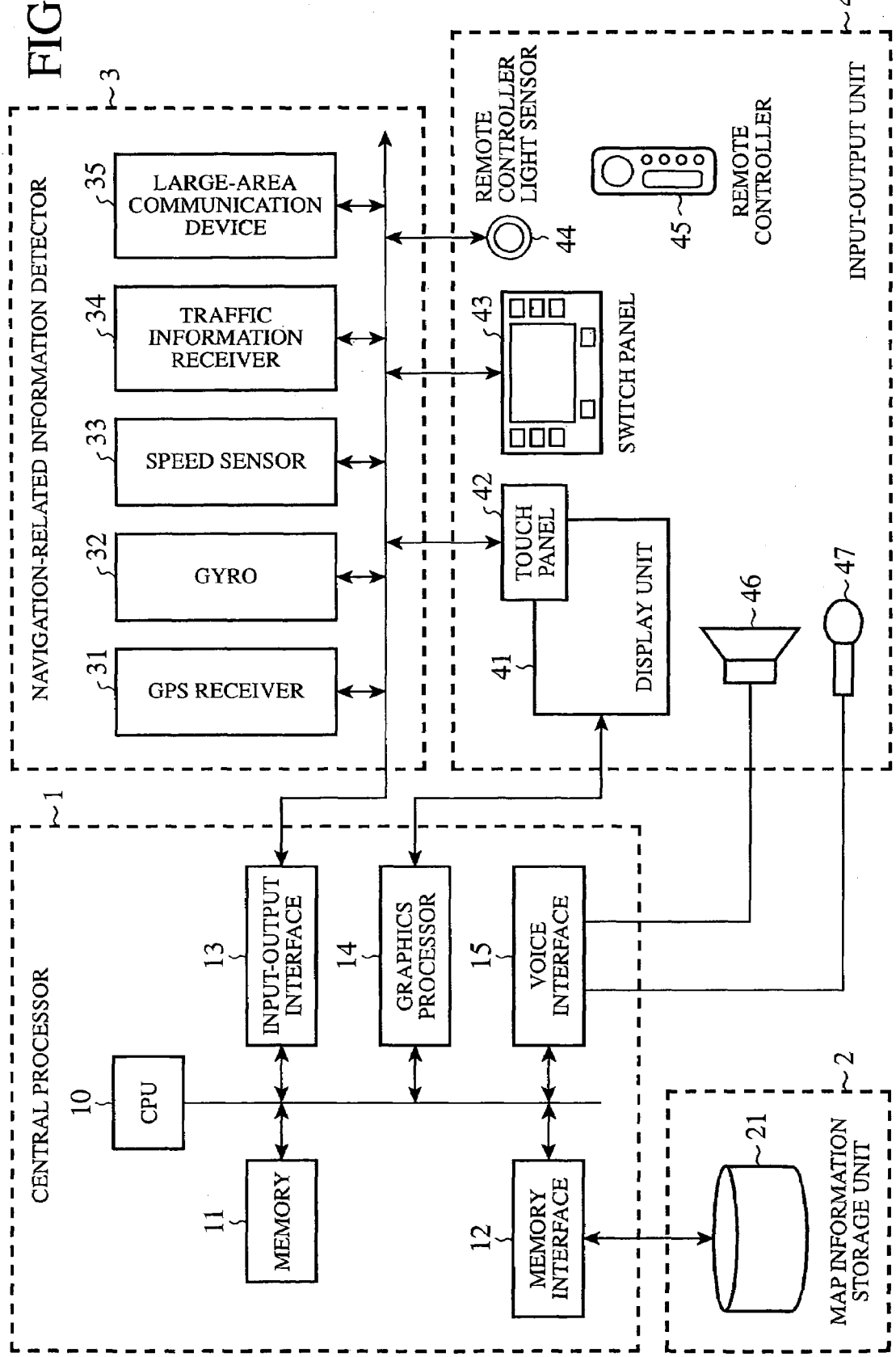
FIG. 1 is a block diagram showing the configuration of an address retrieval system in accordance with a first embodiment of the present invention.

FIG. 1 is a block diagram showing the configuration of an address retrieval system in accordance with a first embodiment of the present invention. This address retrieval system is composed of a central processor 1, a map information storage unit 2, a navigation-related information detector 3, and an input-output unit 4.

The central processor 1 controls the entire address retrieval system. This central processor 1 is composed of a CPU 10, a memory 11, a memory interface 12, an input-output interface 13, an image processor 14, and a voice interface 15.

The CPU 10 executes various processing by operating according to a control program stored in the memory 11. The details of the processing executed by this CPU 10 will be described later. The memory 11 stores a control program for causing the CPU 10 to operate as mentioned above, and moreover, is used as a work area used when the CPU 10 executes the various processing.

The memory interface 12 controls the transmission and reception of data between the CPU 10 and the map information storage unit 2. The input-output interface 13 controls the transmission and reception of data between the CPU 10, and the navigation-related information detector 3 and the input-output unit 4. The image processor 14 generates image data by responding to the instruction from the CPU 10, and transmits the image data to a display unit 41 contained in the input-output unit 4. Thus, the image is displayed on the display unit 41.

The voice interface 15 generates an audio signal based on the audio data sent from the CPU 10, and transmits the signal to a speaker 46 contained in the input-output unit 4. Thus, the speaker 46 generates voice. Moreover, the voice interface 15 receives audio data from a microphone 47 contained in the input-output unit 4, and sends the data to the CPU 10.

The map information storage unit 2 is composed of a memory 21 such as a hard disk drive, for example, read-only storage media such as a DVD or a CD, and their drive devices. In this memory 21, map data is memorized. Further, in this memory 21, an address database is constructed.

Figure 4:
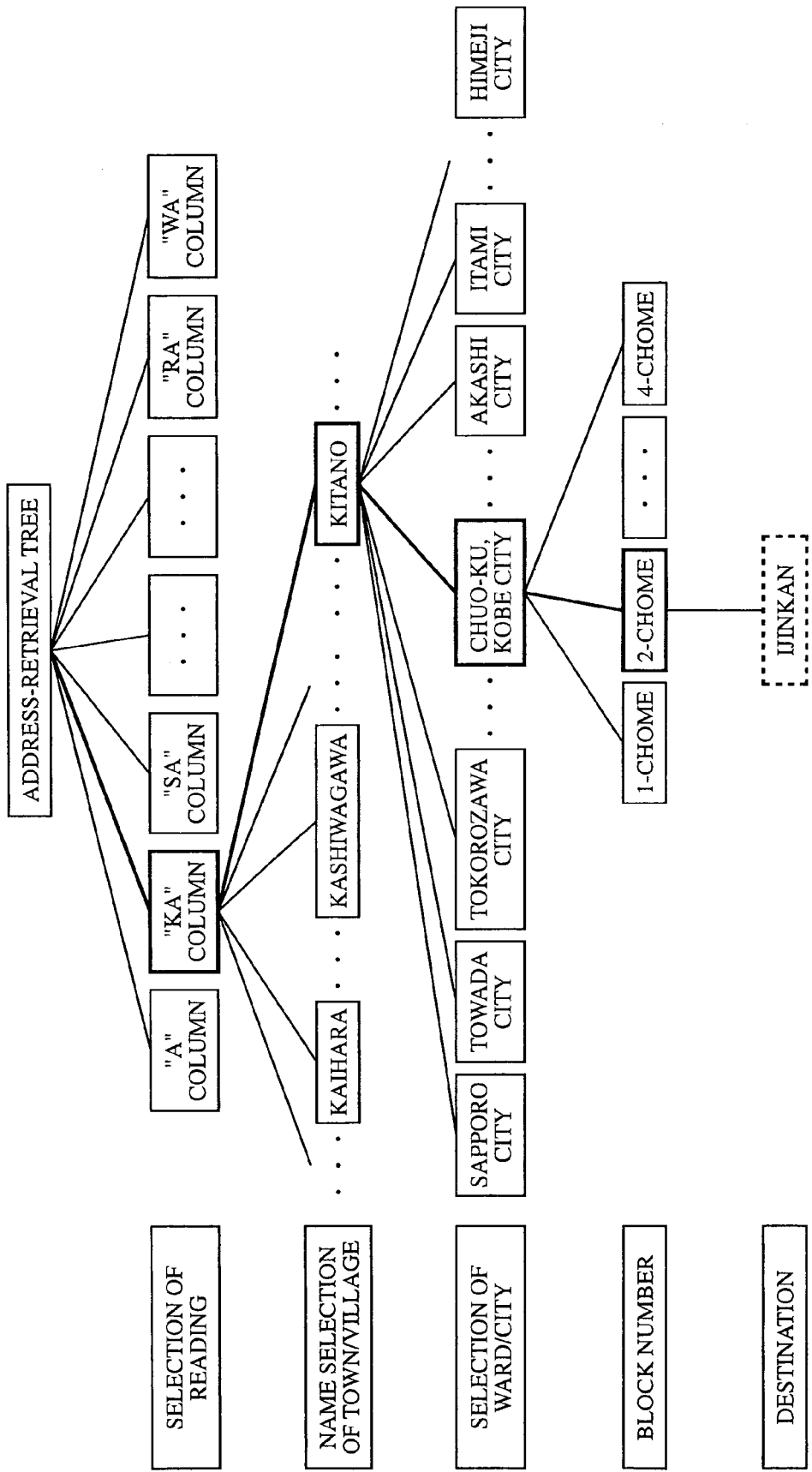
FIG. 4 is a view used for explaining the configuration and operation of the address database used in the address retrieval system in accordance with the first embodiment of the present invention.

The address database is the same as the conventional address database in having a tree structure in which regional names ranging from large-area names to small-area names such as the names of the 47 prefectures of Japan, the names of administrative wards and cities, the names of administrative wards, the names of towns and villages, and block numbers are caused to correspond to nodes; however, the address database is different from the conventional one in being composed of a plurality of hierarchical levels in which a small area is positioned at the upper hierarchical level. In FIG. 4, a portion of the address database is shown, in which the names of towns or villages each indicating an area that is smaller than the area each indicated by the names of the administrative wards and cities serve as nodes that are positioned at the higher level than the level at which the administrative wards and cities are positioned in the hierarchy. In addition, in the address database in accordance with the first embodiment, as the node positioned at the top hierarchical level, characters showing the reading of the heads of the regional names are provided.

The navigation-related information detector 3 obtains information generated associated with the travel of the vehicle or information offered from outside. This navigation-related information detector 3 is composed of a GPS receiver 31, a gyro 32, a speed sensor 33, a traffic-information receiver 34, and a large-area communication unit 35.

The GPS receiver 31 uses information transmitted from GPS satellites (not shown) to detect the position, the traveling azimuth, the speed of the vehicle and so on. The information obtained by the detection carried out by this GPS receiver 31 is sent to the central processor 1. The gyro 32 detects angle-related information such as the angle of traverse and the turning angular velocity associated with the movement of the vehicle. The angle-related information detected by this gyro 32 is sent to the central processor 1. The speed sensor 33 detects the moving velocity and the moving distance of the vehicle. The moving velocity and the moving distance detected by this speed sensor 33 are sent to the central processor 1 as the vehicle-speed information.

The traffic information receiver 34 receives traffic-jam information and construction information transmitted from a center (not shown). The information received by this traffic information receiver 34 is sent to the central processor 1. The large-area communication device 35 exchanges a variety of information with earth stations through use of radio communication such as a public-radio-telephone network and a wireless LAN. The large-area communication device 35 transmits the information received from the earth stations to the central processor 1, and further, transmits the information received from the central processor 1 to the earth stations.

The input-output unit 4 receives user's operation, and further, provides the user with information. This input-output unit 4 is composed of the display unit 41, a touch panel 42, a switch panel (SW panel) 43, a remote-controller (hereinafter referred to simply as a "remocon") light receiver 44, a remocon 45, a speaker 46, and a microphone 47. The touch panel 42, the switch panel 43, the remocon light receiver 44, and the remocon 45 correspond to the input-output portion of the present invention, and the display unit 41 corresponds to the output portion of the present invention.

The display unit 41 is composed of a LCD (liquid crystal display) panel or a small cathode-ray tube, for example, and displays map information and an address retrieval dialog based on the image data sent from the image processor 14 of the central processor 1.

The touch panel 42 is placed on the screen of the display unit 41, and transmits information indicating a touching position to the central processor 1. The user can designate or select an operating button by touching the operating button displayed on the display unit 41 through the touch panel 42.

The switch panel 43 is composed of a plurality of buttons, which are placed on the front of a frame enclosingly holding the display unit 41 and the touch panel 42, and a joy stick. This switch panel 43 transmits information according to the operation of the user to the central processor 1.

The remocon-light receiver 44 receives a radio signal of infrared rays or the like sent from the remocon 45, and transmits the signal to the central processor 1. The remocon 45 generates a radio signal of infrared rays according to the operation by the buttons, and sends the signal to the remocon-light receiver 44. These remocon-light receiver 44 and the remocon 45 are arranged to enable the user to operate the address retrieval system by remote control.

The speaker 46 transforms an electrical signal transmitted from the central processor 1 in mode of an audio signal to an acoustic signal to generate voice. The microphone 47 transforms an acoustic signal, which is voice uttered by the driver, to an electrical signal, and transmits the signal to the central processor 1 as an audio signal.

The operation of the address retrieval system in accordance with the first embodiment of the present invention, which is arranged as described above, will next be explained by referring to the flow chart shown in FIG. 2.

When powering on the address retrieval system, first of all, initialization is executed (step ST10). In this initialization, initial-value-setting to the constituent elements of the central processor 1 is performed, and the initial screen is displayed on the display unit 41.

Subsequently, the user's current position is detected (step ST11). That is, the CPU 10 detects the current position of the vehicle based on the information obtained from the GPS receiver 31 through the input-output interface 13. Then, the display is renewed (step ST12). Namely, the CPU 10 obtains the data of a map of a predetermined range centering on the current position detected in the step ST11 from the memory 21 through the memory interface 12, and sends the data to the image processor 14. Moreover, the CPU 10 obtains angle-related information from the gyro 32 through the input-output interface 13, and further, obtains vehicle-speed information from the speed sensor 33 through the input-output interface 13, and then sends the information to the image processor 14.

The image processor 14 generates image data for drawing a map based on the map data received from the CPU 10, then overlays another image data for making the vehicle mark generated based on the angle-relative information and the vehicle-speed information received from the CPU on this image data, and further, transmits the obtained data to the display unit 41. Thus, on the screen of the display unit 41, the map of the vicinity of the vehicle and the vehicle mark are displayed.

Next, the processing examines whether there exists operation input (step ST13). That is, the CPU 10 examines whether operation information, which shows that an operation is carried out from the touch panel 42, the switch panel 43, or the remocon-light receiver 44 through the input-output interface 13, has been received. Here, when the CPU judges that there is an operation input, operation input processing is performed (step ST14). In this operation input processing, the processing of setting the destination or the passing geographic point is executed according to the operations of the touch panel 42, the switch panel 43 or the remocon 45, and furthermore, the address retrieval processing directly relating to the present invention is performed. The details of this address retrieval processing will be described later.

When it is judged, in the above-mentioned step ST13, that there is no operation input, or when the operation input processing is finished in the step ST14, the CPU examines whether the destination or the passing geographic point has been set (step ST15). Here, when it is judged that the destination or passing geographic point has been not set, the sequence returns to the step ST11, and the processing mentioned above is repeated.

On the other hand, when it is judged in step ST15 that a destination or a passing geographic point has been set, a route recommendation is subsequently made (step ST16). That is, the CPU 10 transmits route data showing a route to the destination or the passing geographic point to the image processor 14. The image processor 14 generates image data for displaying the route based on this route data, and transmits the data to the display unit 41. Thus, the route to the destination or the passing geographic point is displayed on the map displayed on the screen of the display unit 41.

Subsequently, route guidance is given (step ST17). That is, the CPU 10 obtains a guidance message, associated with the map data, stored in the memory 21 through the memory interface 12, and sends the message to the voice interface 15 as audio data. The voice interface 15 transforms the received audio data into an audio signal, and sends the signal to the speaker 46. Thus, the speaker 46 generates voice for guiding the route.

Next, the CPU examines whether the vehicle has arrived at the destination (step ST18). In other words, the CPU 10 examines whether the current position of the vehicle, shown by the information obtained from the GPS receiver 31 through the input-output interface 13, coincides with the position of the destination set in the step ST14. Here, when it is judged that the vehicle has not arrived at the destination, the sequence returns to the step ST11, and the processing mentioned above is repeated. On the other hand, when it is judged, in the step ST18, that the vehicle has arrived at the destination, the processing ends.

The details of the address retrieval processing in the operation input processing executed in the step ST14 in the flow chart shown in FIG. 2 will now be described by referring to the flow chart shown in FIG. 3. As described above, this operation input processing is executed when the pressing of the operating button displayed on the screen of the display unit 41 is detected by the touch panel 42, when the switch of the switch panel 43 is pressed, or when the button of the remocon 45 is pressed.

Figure 5A:
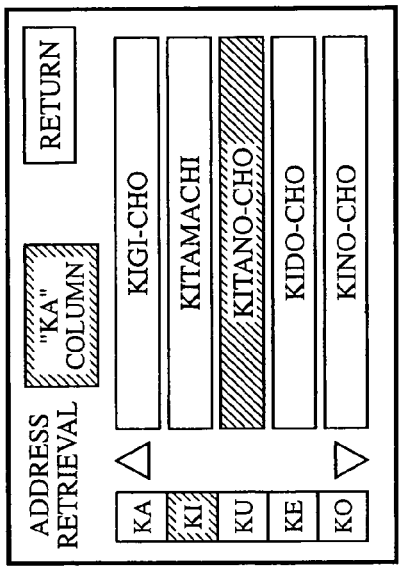
FIGS. 5A-5F are views showing examples of dialogues used in the address retrieval system in accordance with the first embodiment of the present invention.

When the shift to the retrieval mode is directed by operating the touch panel 42, the switch panel 43 or the remocon 45, first of all, menu display is given (step ST20). That is, when operation information from the input-output unit 4 has directed the shift to the retrieval mode, the CPU 10 sends the image data of the menu screen to the image processor 14. Thereby, the menu screen shown in FIG. 5A is displayed on the display unit 41. This menu screen has operating buttons such as Address Retrieval, Facility Retrieval, ZIP Code Retrieval, 50-character (Syllabary) Retrieval, and Phone-Number Retrieval. The user can select desired retrieval.

Then, the CPU examines whether the address retrieval in the menu screen is selected (step ST21). That is, the CPU 10 examines whether the operating button of "Address Retrieval" is pressed, based on the information showing the touched position sent from the touch panel 42 through the input-output interface 13. When it is judged that the address selection has not been selected, other processing is executed (step ST22). In this step ST22, the facility retrieval, the ZIP code retrieval, the 50-character retrieval, or the telephone-number retrieval is executed; however, detailed explanation is omitted.

Figure 5B:
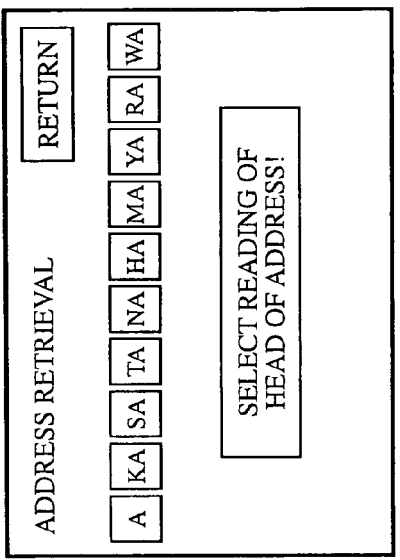

When it is judged, in step ST21, that the address selection has been selected, the address retrieval dialog is displayed (step ST23). The address retrieval dialog displayed in this step ST23 is arranged as shown in FIG. 5B such that the reading of the head of the regional name of the destination geographic point can be selected from among the columns in the kana syllabary headed by "a," "ka," to "wa."

When the reading of the head of the regional name is selected in this address retrieval dialog, address-database retrieval processing is performed (step ST24). That is, the CPU 10 searches the address database constructed in the memory 21, and reads out the regional names of all the child nodes having the selected reading as their parent nodes, namely, the names of towns or villages positioned at the second hierarchical level from this memory 21 through the memory interface 12. FIG. 4 shows the state in which the user selected the column headed by "ka" in order to retrieve "2-chome Kitano-cho, Chuo-ku, Kobe City," and thereby the names of towns or villages such as "Kaihara," . . . "Kashiwa-gawa," . . . "Kitano" are retrieved.

Figure 5C:
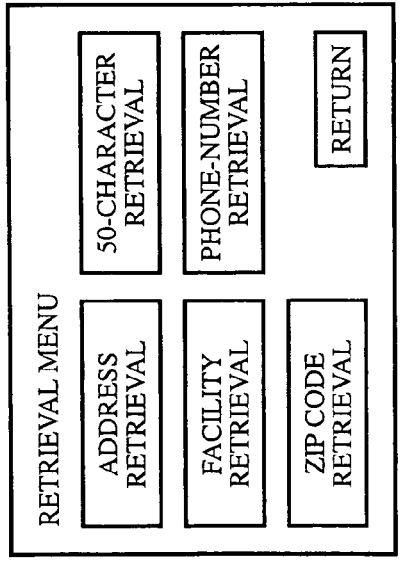

Subsequently, "candidates" are displayed in list form (step ST25). That is, the CPU 10 sends the data showing the town and village names read out in the step ST24 to the image processor 14. The image processor 14 generates an image signal based on this received data, and transmits the signal to the display unit 41. Thereby the town-and-village selection dialog including the list of the town and village names having the reading of the column headed by "ka," which is shown in FIG. 5C, is displayed in the display unit 41.

This town-and-village selection dialog is provided with buttons for classifying the names according to the vowels in the column headed by "ka," and buttons marked with a vertical arrow for scrolling the screen, in addition to the list of the town and village names. Moreover, if the number of town and village names shown in list form is small, the display of the buttons for classifying the names according to their vowels is omitted, and further, if all the town and village names can be displayed in the town-and-village selection dialog, the display of the vertical arrows is also omitted.

The user selects a desired town or village name on this town-and-village selection dialog with the touch panel 42, the switch panel 43, or the remocon 45 contained in the input-output unit 4. Here, suppose that the user selects "Kitano-cho" in the town-and-village selection dialog in order to search "2-chome Kitano-cho, Chuo-ku, Kobe City."

Subsequently, the CPU examines whether the selection has reached the hierarchical bottom level or the display is required (step ST26). In this step ST26, when it is judged that the selection has not reached the bottom level, and that the display is also not required, the sequence returns to the step ST24, and the processing mentioned above is repeated.

The procedure of this repetition processing is as follows: That is, in the second address database search processing (step ST24), the CPU 10 searches the address database constructed in the memory 21, and reads out the regional names of all the child nodes having the selected "Kitano-cho" as their parent nodes, namely, the names of the administrative wards and cities positioned at the third hierarchical level from this memory 21 through the memory interface 12. FIG. 4 shows the state in which the user selected "Kitano-cho" in order to search "2-chome Kitano-cho, Chuo-ku, Kobe City," and thereby the names of the administrative wards and cities such as "Sapporo City," "Towada City," . . . "Himeji City" are retrieved.

Figure 5D:
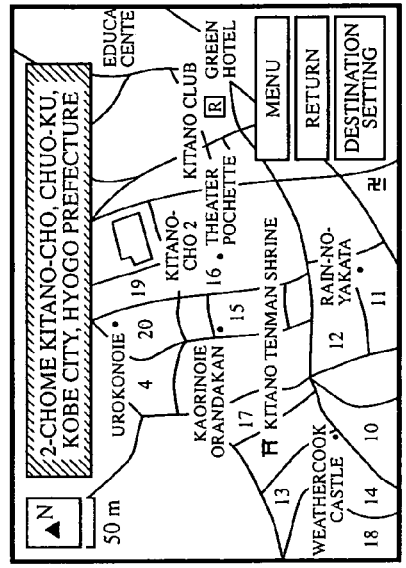

In the second candidates list display processing (step ST25), the CPU 10 sends the data showing the names of the administrative wards and cities read out in the step ST24 to the image processor 14. The image processor 14 generates an image signal based on this received data, and transmits the signal to the display unit 41. In such a way, the administrative-ward-and-city selection dialog containing the list of the names of the administrative wards and cities, in which the town or village name of "Kitano-cho" exists, the dialog which is shown in FIG. 5D, is displayed in the display unit 41. This administrative-ward-and-city selection dialog is provided with buttons marked with a vertical arrow for scrolling the screen. In addition, the administrative-ward-and-city selection dialog may be arranged to have buttons for classifying the names based on their vowels as in the case of FIG. 5C. Moreover, the names of the administrative wards and cities can be displayed in the order of the Japanese syllabary or in the order of the geographical position (for example, in the order of from the north to the south).

The user selects the name of a desired administrative ward and city in this administrative-ward-and-city selection dialog by using the touch panel 42, the switch panel 43 or the remocon 45 each contained in the input-output unit 4. Now, suppose that the user selects "Chuo-ku, Kobe City" in the administrative-ward-and-city selection dialog in order to search "2-chome Kitano-cho, Chuo-ku, Kobe City." In this case, even if the user has unclear memory about the middle portion of the address notation of the desired geographic point, for example, because the user usually has general geographical information about the point, it is hardly considered that the user selects Sapporo or Tokorozawa in order to retrieve the "Ijinkan" in Kobe. Accordingly, the probability increases that the user can select the administrative ward and city that is desired. At the time of selecting the administrative ward and city, the selection has not reached the hierarchical bottom level, and the display has not been required. For this reason, the sequence returns to the step ST24.

In the third address-database searching processing (step ST24), the CPU 10 searches the address database constructed in the memory 21, and reads out the regional names of all the child nodes having the selected "Chuo-ku, Kobe City" as their parent nodes, namely, the names of "chome" positioned at the fourth hierarchical level from this memory 21 through the memory interface 12. FIG. 4 shows the state in which the user selected "Chuo-ku, Kobe City" in order to search "2 chome Kitano-cho, Chuo-ku, Kobe City," and thereby chome names such as "1-chome," "2-chome," . . . "4-chome" are searched.

Figure 5E:
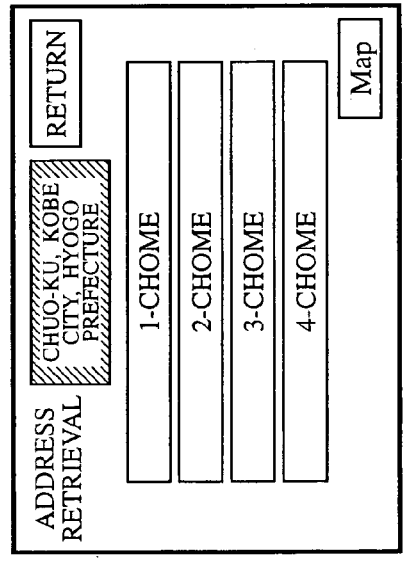

In the third candidate list display processing (step ST25), the CPU 10 sends the data showing the chome name read out in the step ST24 to the image processor 14. The image processor 14 generates an image signal based on this received data, and transmits the signal to the display unit 41. Thus, the chome selection dialog containing the list of the names of chomes existing in "Kitano-cho, Chuo-ku, Kobe City, Hyogo Prefecture," which is shown in FIG. 5E, is displayed in the display unit 41. This chome selection dialog is provided with a Map button for requiring a map display.

Figure 5F:
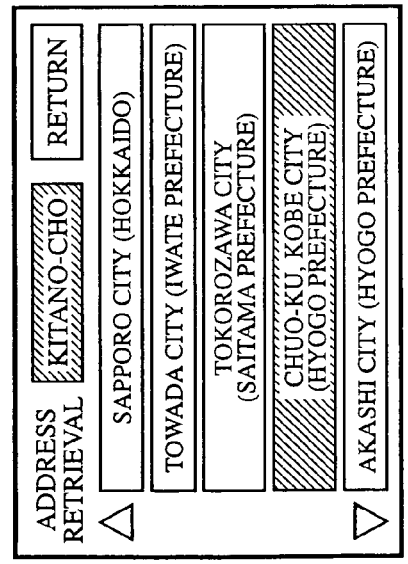

The user selects a desired chome name on this chome selection dialog by using the touch panel 42, the switch panel 43 or the remocon 45 contained in the input-output unit 4, and further, presses down the Map button. Now, suppose that the user selects "2-chome" in the chome selection dialog in order to search "2-chome Kitano-cho, Chuo-ku, Kobe City." Thus, it is judged that the selection has reached the hierarchical bottom level, in the step ST26, and the map retrieval and the map display are performed (step ST27). That is, the CPU 10 obtains the map data corresponding to the 2-chome selected in the chome selection dialog from the memory 21 through the memory interface 12, and sends the data to the image processor 14. The image processor 14 generates a display signal for drawing the map based on this map data, and sends the signal to the display unit 41. Thus, a map centering on "2-chome Kitano-cho, Chuo-ku, Kobe City, Hyogo Prefecture" is displayed in the display unit 41 as shown in FIG. 5F.

In addition, when the user depressed the Map button halfway through the series of selections of regional names, in the step ST27, a processing in which the map of the area specified at that time is displayed in the display unit 41 is performed. Moreover, this address retrieval system can be arranged such that not only the map centering on "2 chome Kitano-cho, Chuo-ku, Kobe City, Hyogo Prefecture" located by the above-described series of selections of regional names is displayed, but also an address, which is more specifically located, is set as a destination or a passing geographic point.

As explained above, the address retrieval system in accordance with the first embodiment of the present invention 1 enables the map of a desired geographic point to be displayed, and also enables a destination or a passing geographic point to be set, even if the user does not know part of the address notation of the desire geographic point or unclearly knows the address thereof, thereby increasing the user's convenience.

Embodiment 2

The address retrieval system in accordance with a second embodiment of the present invention is arranged such that the chome selection dialog shown in FIG. 5E, used in the address retrieval system according to the first embodiment, is displayed with the chome provided with attribute information about the chome.

FIG. 6 is a view showing an example of the chome selection dialogue used in the address retrieval system in accordance with the second embodiment of the present invention. In this chome selection dialog, the chome to be selected is displayed while having attribute information added to the chome, the information consisting of the information about a facility, which is representative in the chome, or area information in the chome.

In the chome selection dialogue used in the address retrieval system in accordance with the first embodiment, shown in FIG. 5E, the vicinities of the desired region can be displayed even if the user selects any chome, which increases the user's convenience in comparison with conventional systems. However, if the user's memory is not clear at the chome level, there remains the possibility of incorrect chome selection. In contrast to this, in the address retrieval system in accordance with the second embodiment 2, the chome is displayed having the name of a representative facility at the chome and area information about the chome, added thereto. This can reduce the possibility of occurrence of incorrect chome selection, and makes further easy the selecting operation.

Embodiment 3

The address retrieval system in accordance with a third embodiment of the present invention is constructed by adding the hierarchical level of the 47 prefectures of Japan each of which covers an area that is larger than the area covered by each of the administrative wards and cities between the hierarchical level of towns and villages and the hierarchical level of the administrative wards and cities in the address retrieval system in accordance with the first embodiment.

Figure 7:
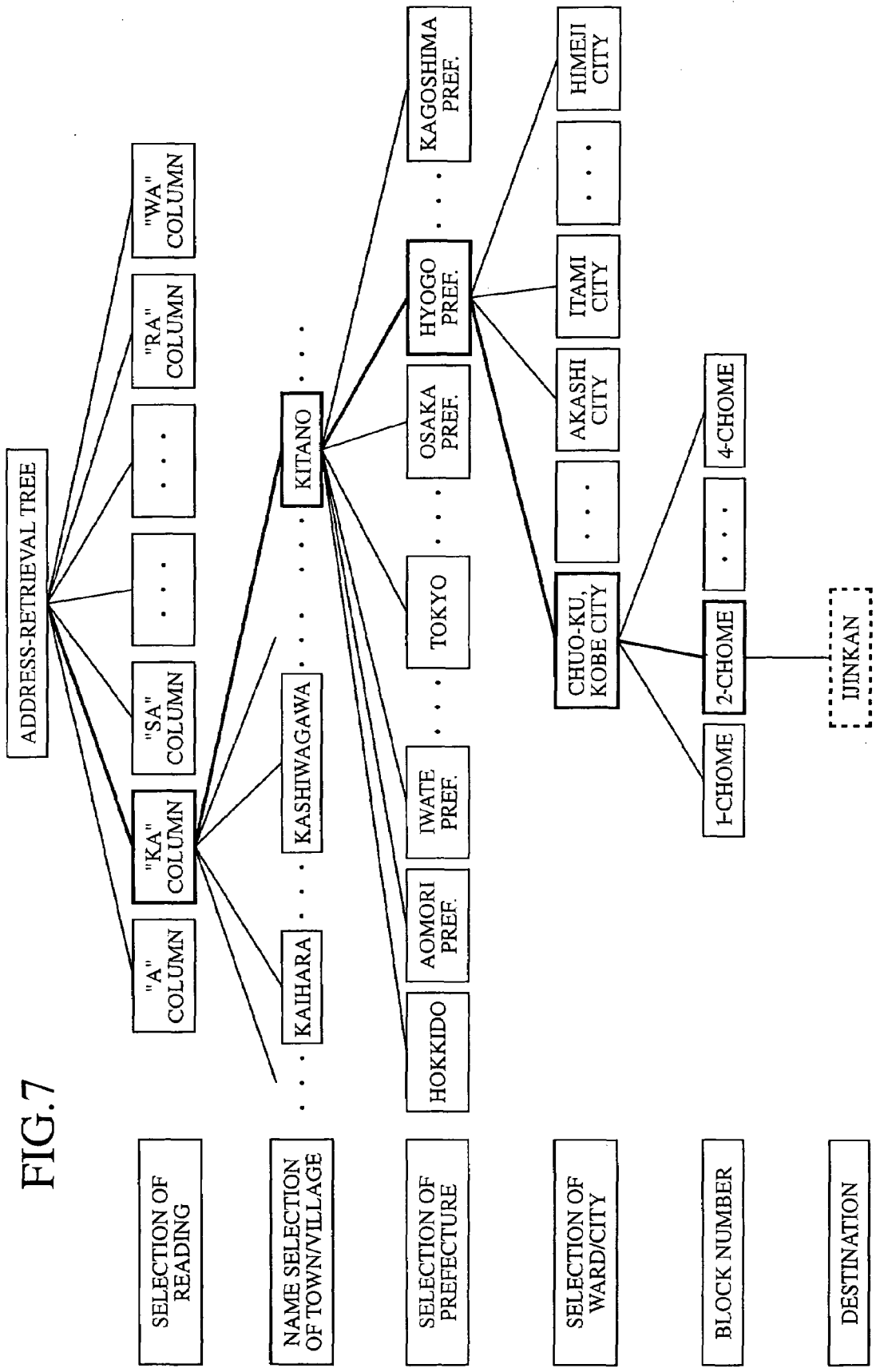
FIG. 7 is a view used for explaining the configuration and operation of an address database used in an address retrieval system in accordance with a third embodiment of the present invention.
Figure 8A:
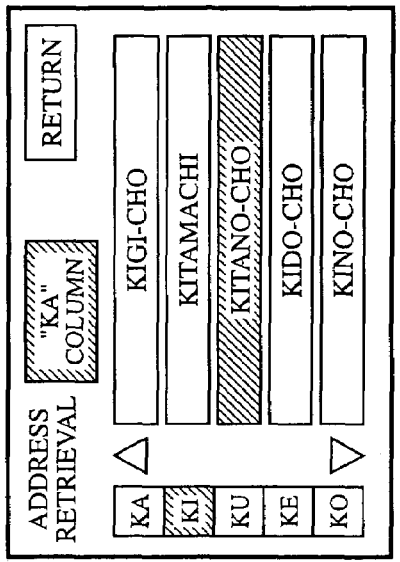
FIGS. 8A-8F are views showing examples of dialogues used in the address retrieval system in accordance with the third embodiment of the present invention.
Figure 8B:
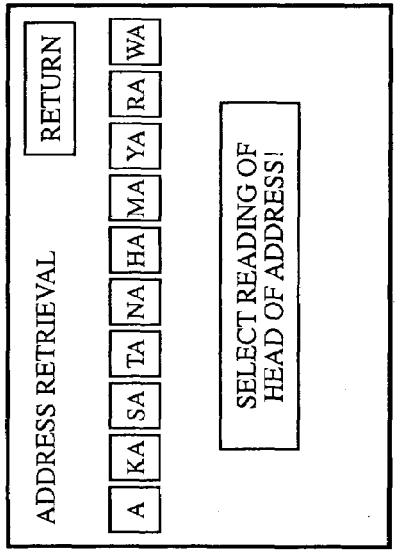
Figure 8C:
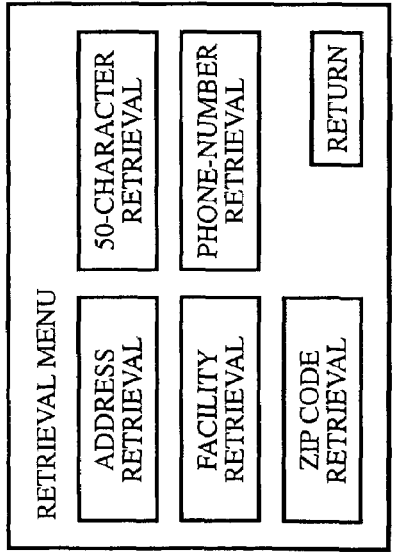
Figure 8D:
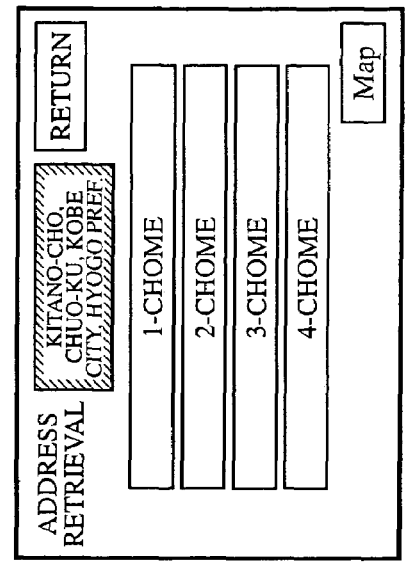
Figure 8E:
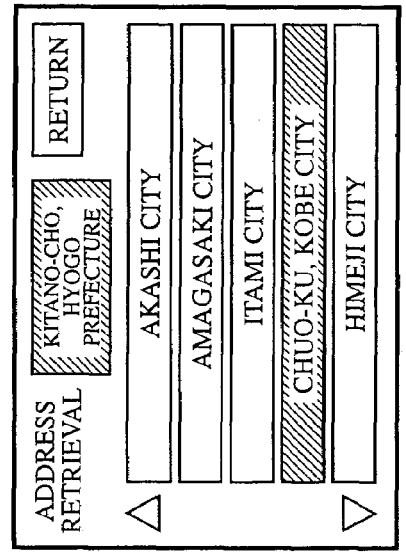

FIG. 7 is a view used for explaining the configuration and operation of the address database used in the address retrieval system in accordance with the third embodiment. In the address retrieval system operating by using this address database, after a town or village name is selected, the Japan's prefecture selection dialog, which is shown in FIG. 8D, is displayed. The administrative-ward-and-city selection dialog, shown in FIG. 8E, is displayed by the selection of one of the names of the 47 prefectures of Japan in this Japan's prefecture selection dialog, as in the case of the first embodiment. The operations of this system except this operation are the same as the operations of the address retrieval system in accordance with the first embodiment.

Figure 8F:
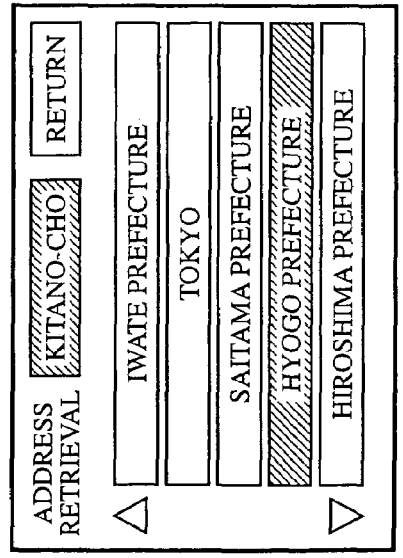

The address retrieval system in accordance with the third embodiment of the present invention especially effectively functions when a large number of "Kitano-chos," one of which indicates the objective geographic point, exist over a wide area. In this case, similarly as in the case of the first embodiment, so long as the user has some geographical knowledge about the destination, it is hardly considered that the user selects a prefecture that is completely different from the one in which the destination exist. Therefore, the user properly selects one of the prefecture names shown in the Japan's prefecture selection dialog, and the user can arrive at the desired geographic point by successively tracing the dialogs shown in FIG. 8E and FIG. 8F.

Figure 9:
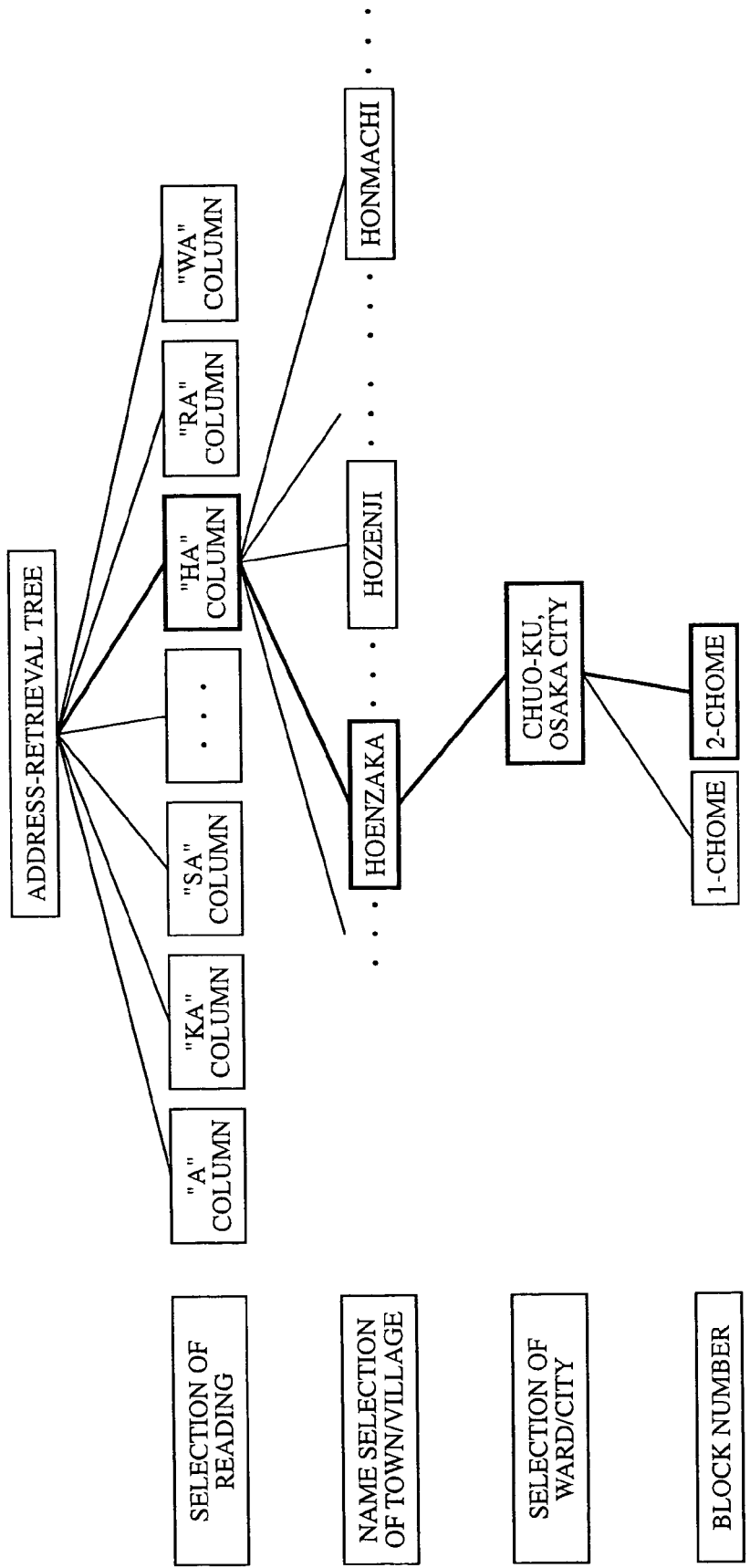
FIG. 9 is a view used for explaining the configuration and operation of an address database used in an address retrieval system in accordance with a modification of the third embodiment of the present invention.

Further, the address retrieval system in accordance with the third embodiment of the present invention can be modified such that the user can carry out direct selection up to the stage on which "chome" is selected when the number of the administrative wards and cities in which the name of the desired town or village exists is very small. FIG. 9 is a view used for explaining the configuration and operation of the address database used in such a case, and the figure shows the case in which the desired town or village name exists only in a single administrative ward and city.

Figure 10A:
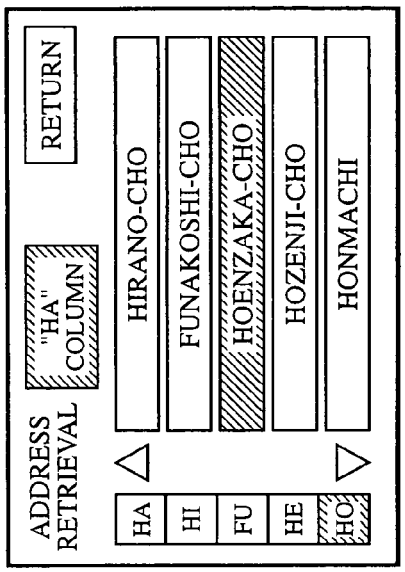
FIGS. 10A-10E are views showing examples of dialogues used in the address retrieval system in accordance with the modification of the third embodiment of the present invention.
Figure 10B:
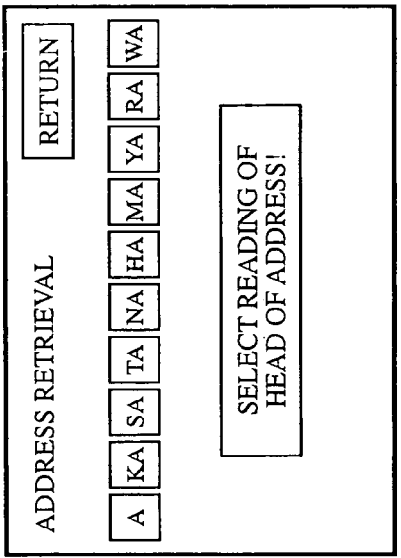
Figure 10C:
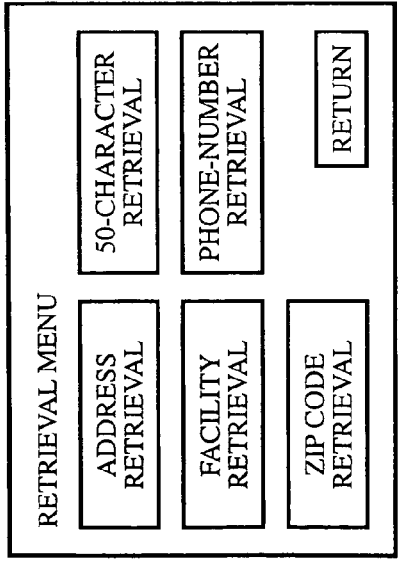
Figure 10D:
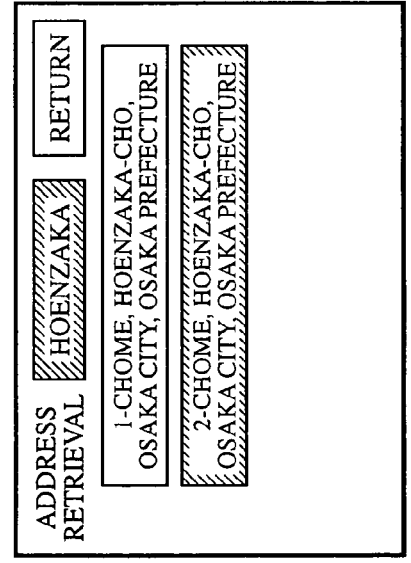
Figure 10E:
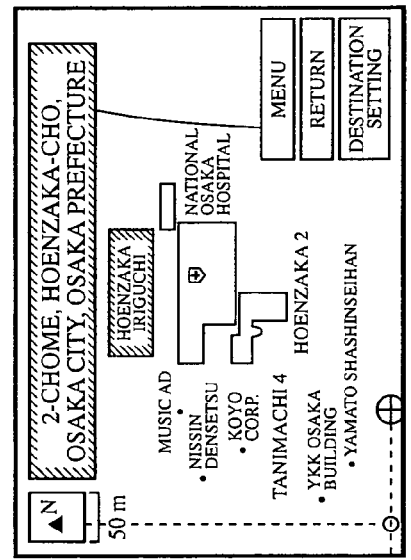

In such a case, because the selection of the administrative wards and cities for narrowing down the cities is unnecessary, a chome selection dialog in which the entire address notation is displayed as shown in FIG. 10D is used. Such a configuration can reduce the number of levels in the hierarchy at which selecting operation must be executed, and enables the selection of a desired geographic point by use of a dialog in which the entire address notation is shown, thereby making easy the selecting operation.

Embodiment 4

The address retrieval system in accordance with a fourth embodiment of the present invention is arranged such that the travel history is considered in locating a desired geographic point.

The configuration of the address retrieval system according to the fourth embodiment of the present invention is the same as that of the address retrieval system in accordance with the first embodiment, shown in FIG. 1.

The operation of the address retrieval system in accordance with the fourth embodiment of the present invention will now be explained by referring to the flow chart shown in FIG. 11. The same processes that shown in FIG. 2 are designated by similar numerals to that used in FIG. 2, and the explanations are omitted.

Figure 2:
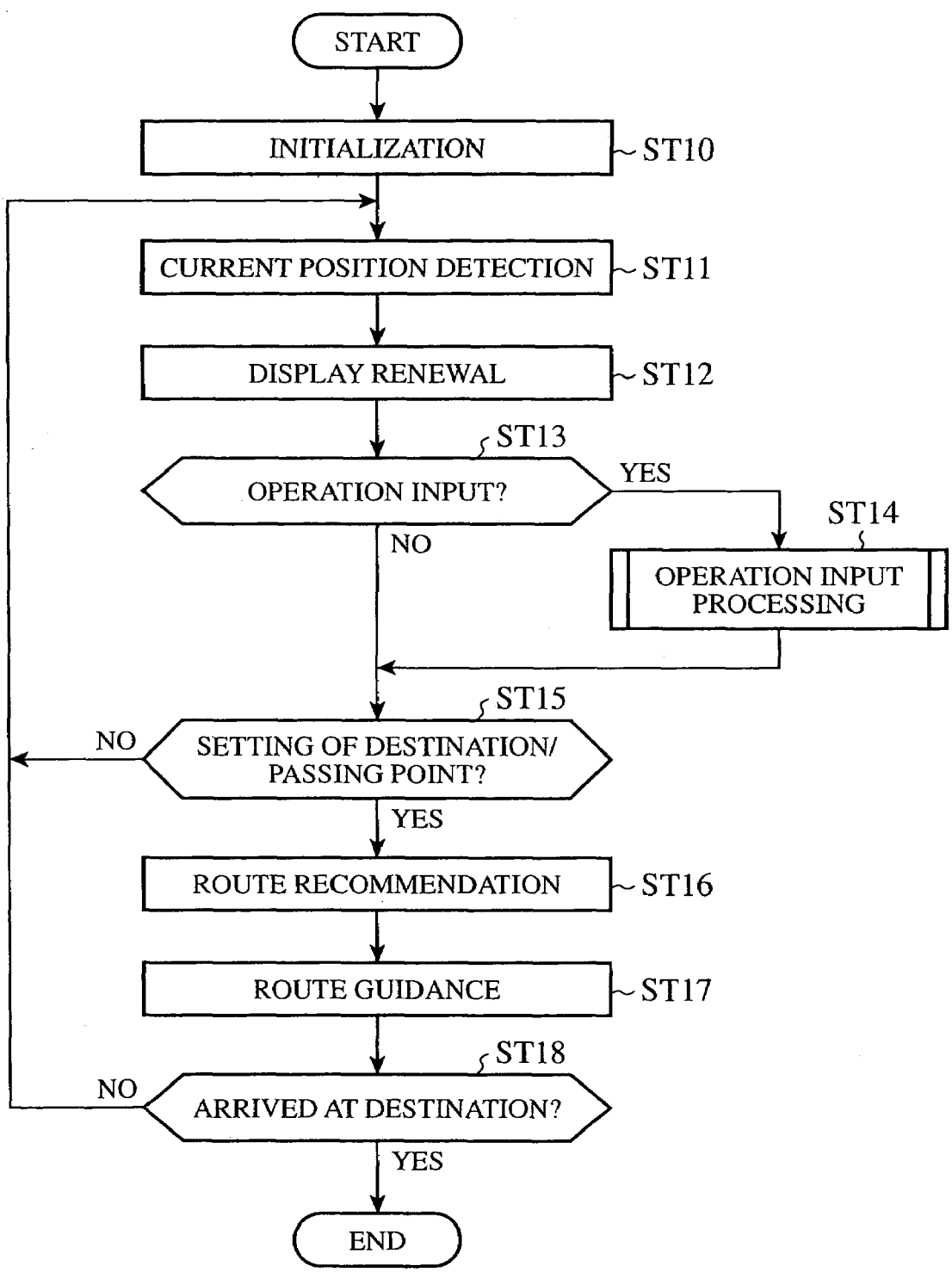
FIG. 2 is a flow chart showing the operation of the address retrieval system in accordance with the first embodiment of the present invention.
Figure 3:
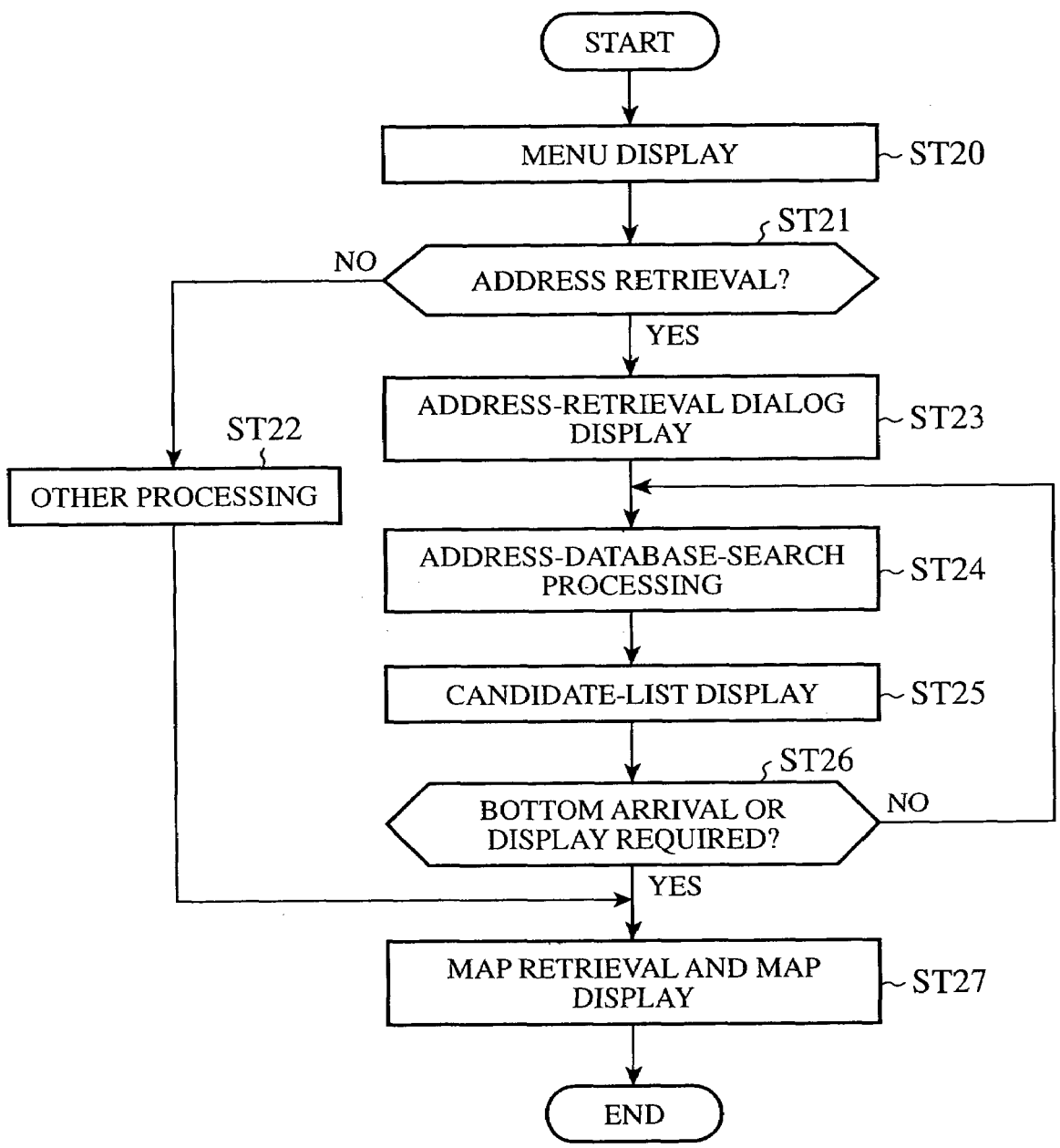
FIG. 3 is a flow chart showing the details of the address retrieval processing in the operation input processing executed in the step ST14 shown in FIG. 2.

In this address retrieval system, a travel history collection processing (step ST30) is added between the step ST11 and step ST12 in the flow chart shown in FIG. 2. This travel history collection processing corresponds to the travel history collection means of the present invention. In the travel history collection processing, the CPU 10 accumulates and memorizes, in the memory 11, the frequency of travel a vehicle in the administrative wards and cities, based on the information showing the current position of the vehicle, obtained in the step ST11, as the travel history thereof in each administrative ward and city. This travel history enables the judgment about the area where the user travels by choice. The travel history memorized in this memory 11 is referred to at the operation input processing (step ST14).

Figure 11:
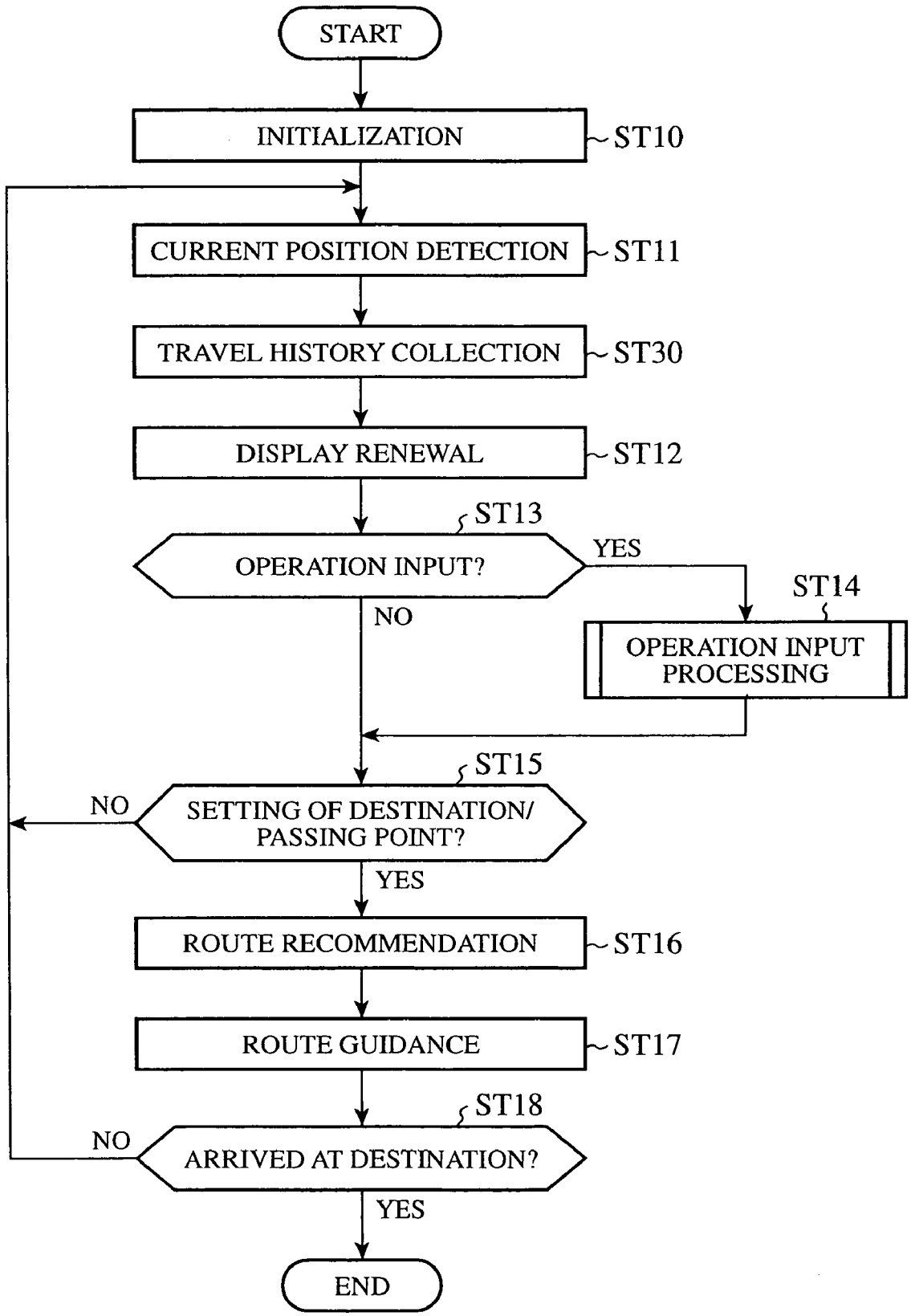
FIG. 11 is a flow chart showing the operation of an address retrieval system in accordance with a fourth embodiment of the present invention.
Figure 12:
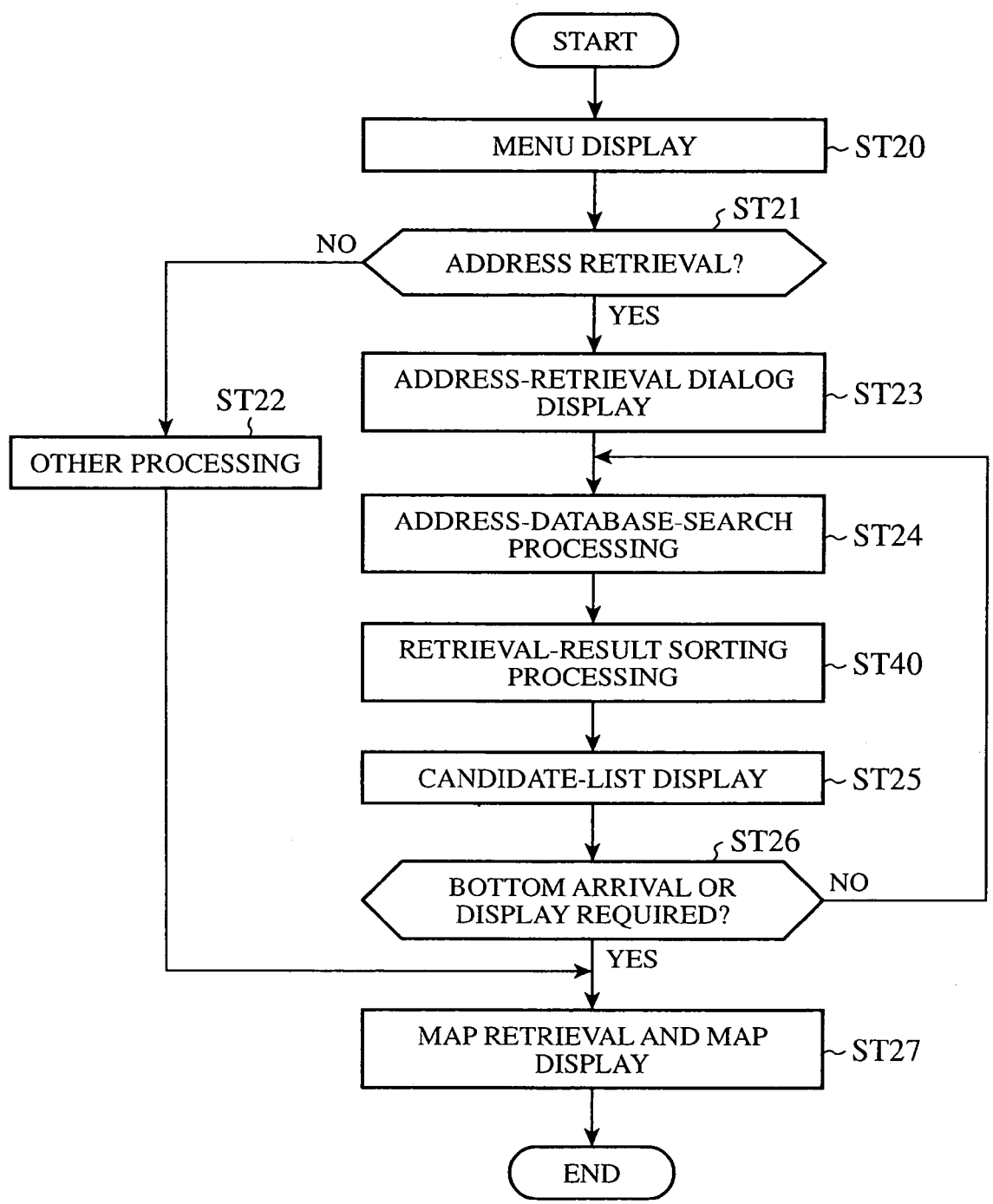
FIG. 12 is a flow chart showing the details of the address retrieval processing in the operation input processing executed in the step ST14 shown in FIG. 11.

FIG. 12 is a flow chart showing the details of the address retrieval processing in the operation input processing executed in the step ST14 in the flow chart shown in FIG. 11. In this address retrieval system, a retrieval-result sorting processing (step ST40) is added between the step ST24 and the step ST25 in the flow chart shown in FIG. 3.

In this retrieval-result sorting processing, the names of a plurality of the administrative wards and cities retrieved in the step ST24 are sorted according to the travel history. In the next step ST25, when the names of a plurality of the administrative wards and cities are displayed in the administrative-ward-and-city selection dialog, the administrative wards and cities that were sorted are displayed. Accordingly, the administrative wards and cities where the user travels by choice are displayed on a priority basis in the administrative-ward-and-city selection dialog.

Figure 13A:
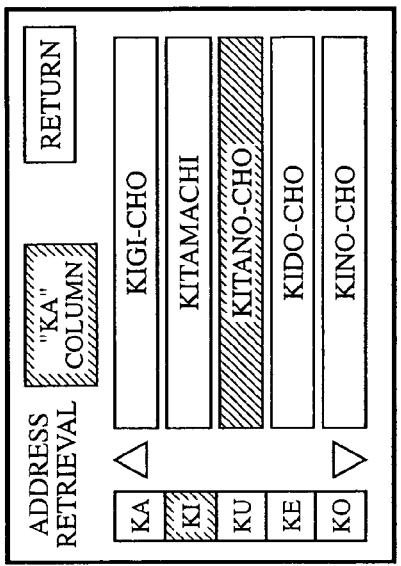
FIGS. 13A-13F are views showing examples of dialogues used in the address retrieval system in accordance with the fourth embodiment of the present invention.
Figure 13B:
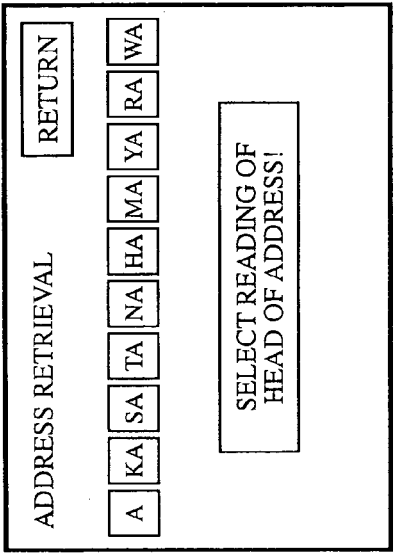
Figure 13C:
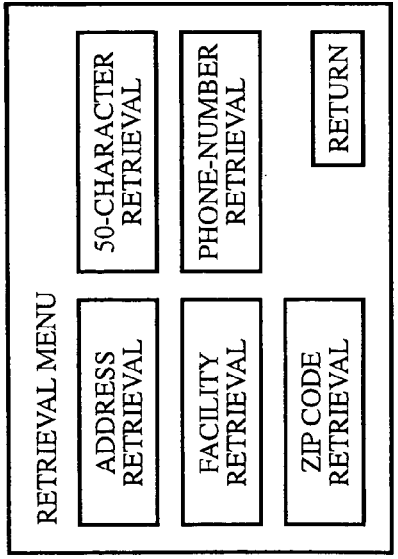
Figure 13D:
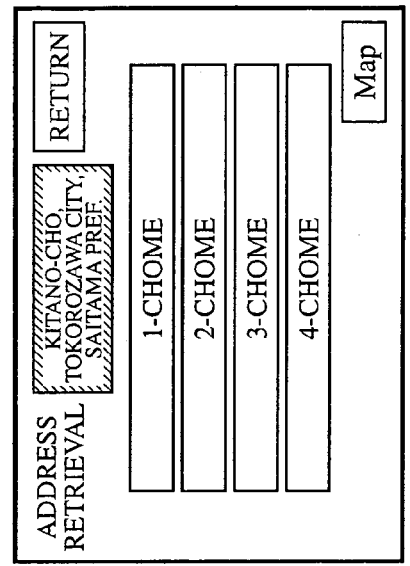
Figure 13E:
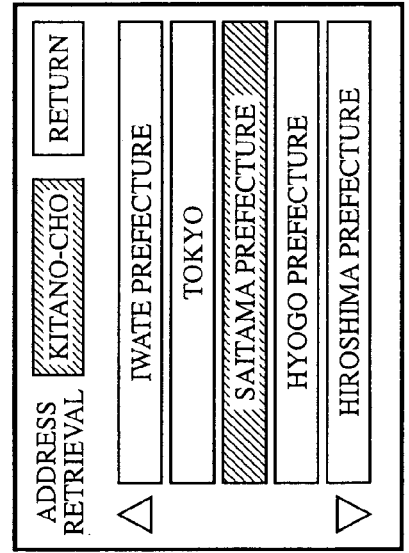
Figure 13F:
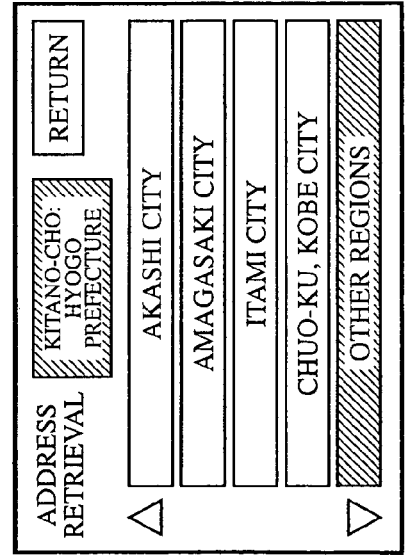

FIG. 13D shows an example of the administrative-ward-and-city selection dialog used when there are a lot of travel histories in Hyogo Prefecture, and the names of the administrative wards and cities in Hyogo prefecture, in which the desired town and village names exist, are displayed therein on a priority basis. Moreover, the administrative-ward-and-city selection dialog is provided with an area-switching button in preparation for the case in which the user wants to travel to other areas. FIG. 13E shows an example of the case where the dialog for selecting the Japan's prefectures, which are larger areas, is displayed when the area-switching button is selected, as in the case of the address retrieval system in accordance with the third embodiment.

As explained above, according to the address retrieval system of the fourth embodiment of the present invention, retrieval operation can be performed in a driver's driving area oriented manner. As a result, complicated selection of one regional name from among the mixed names of close and remote places can be avoided, thereby increasing the user's convenience.

Embodiment 5

The address retrieval system in accordance with a fifth embodiment of the present invention is arranged such that the destination history is considered upon specification of a desired geographic point.

The configuration of the address retrieval system in accordance with the fifth embodiment of the present invention is the same as that of the address retrieval system in accordance with the first embodiment as shown in FIG. 1.

Figure 14:
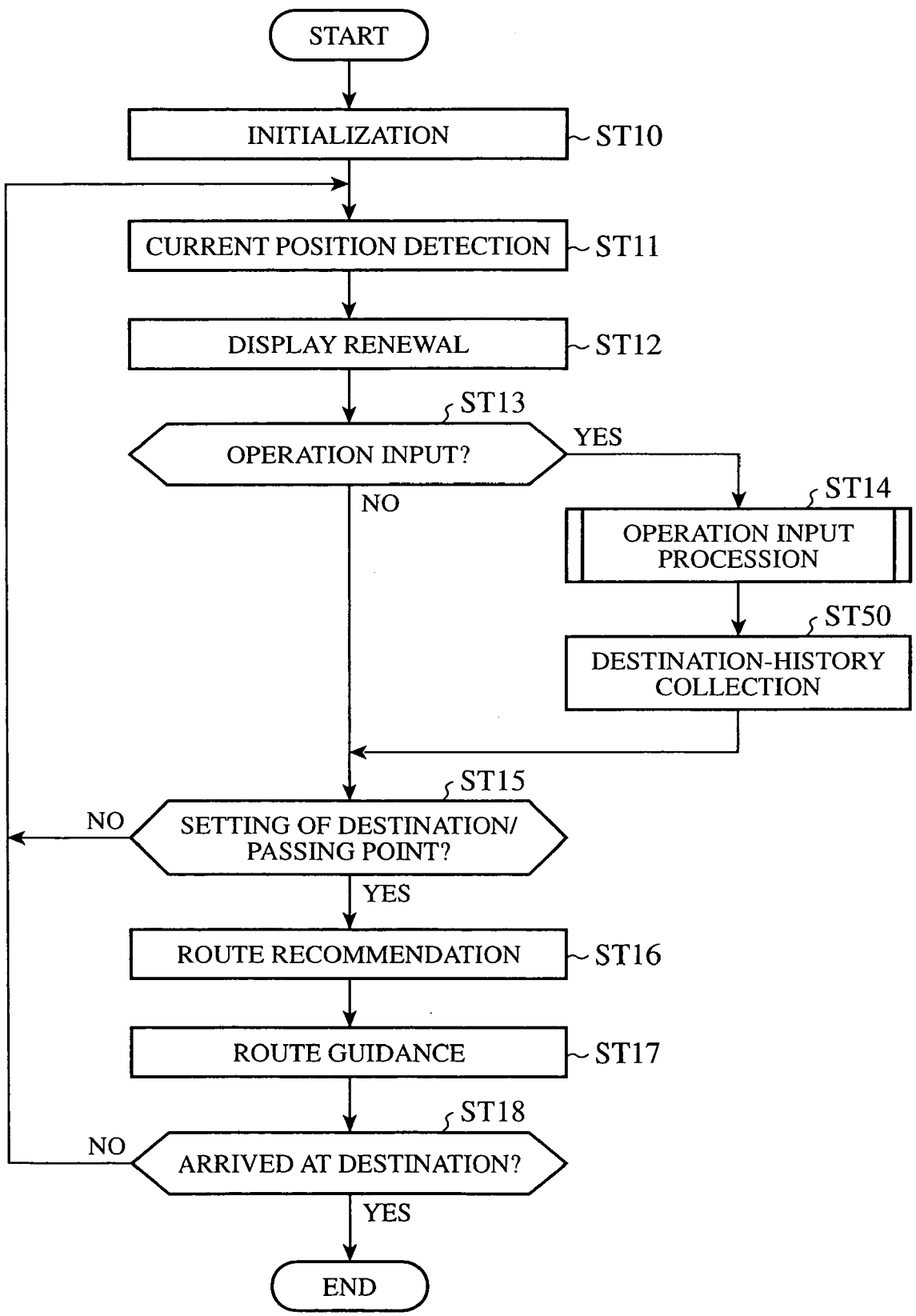
FIG. 14 is a flow chart showing the operation of the address retrieval system in accordance with a fifth embodiment of the present invention.

The operation of the address retrieval system in accordance with the fifth embodiment of the present invention will now be explained by referring to the flow chart shown in FIG. 14. The same processes as that shown in FIG. 2 are designated by similar numerals to that used in FIG. 2, and the explanations are omitted.

In this address retrieval system, destination history collection processing (step ST50) is added subsequent to the step ST14 in the flow chart shown in FIG. 2. This destination history collection processing corresponds to the destination history collection means of the present invention. In the destination history collection processing, the CPU 10 accumulates and memorizes, in the memory 11, the setting frequency of an area that is set as a destination by use of the navigation function, as the navigation history in each administrative ward and city. This destination history enables the judgment about the areas that the user often sets as the destination. The destination history memorized in this memory 11 is referred to at the operation input processing (step ST14).

The operation input processing is the same as that in accordance with the fourth embodiment, shown in FIG. 12 except the following points. That is, in this retrieval-result sorting processing (step ST40), the names of a plurality of the administrative wards and cities retrieved in the step ST24 are sorted according to the destination history. When the names of a plurality of the administrative wards and cities are displayed in the administrative-ward-and-city selection dialog in the next step ST25, the administrative wards and cities that were sorted are displayed. Accordingly, in the administrative-ward-and-city selection dialog, the administrative wards and cities that the user often sets as the destination are displayed on a priority basis.

As explained above, according to the address retrieval system of the fifth embodiment of the present invention, the areas that are often set as the destination can be selected on a priority basis. Therefore, unnecessary information about remote areas and well-known areas positioned in the vicinity of the user's house, in which the user often travels, the information which is almost not used, is kept at distance, and retrieval meeting the user's preferences can be performed.

Furthermore, in the fourth and fifth embodiments as described above, the address retrieval system can be arranged such that the order of displaying the regional name in the dialog is changed by using the travel history and/or the destination history in combination with the history of utilization time zone and/or the history of a day of the week of utilization (information about a day of the week when the search is executed is accumulated, and the area displayed on a priority basis is switched for a weekday use or holiday use, namely, entertainment use.).

What is claimed is:

1. A computer-implemented method comprising:
providing a geographical address database associated with a postal addressing system, the geographical address database comprising a tree structure of nodes in which regional names, which constitute a geographical address, are stored in multiple levels of nodes, the multiple levels of nodes comprising:
a first level of nodes representing the regional names of first geographical areas,
a second level of nodes representing the regional names of second geographical areas, wherein each of the first geographical areas is a sub-division of one of the second geographical areas according to the postal addressing system, and
a third level of nodes representing the regional names of third geographical areas, wherein each of the third geographical areas is a sub-division of one of the first geographical areas according to the postal addressing system;
selecting one of the nodes in the first level based on a user input;
traversing the tree structure from the selected node in the first level to a selected node in the second level;
searching the third level for a child node of the selected node in the second level; and
retrieving and outputting the regional name represented by the child node of the selected node in the selected level,
wherein the nodes in the first level are parent nodes of the nodes in the second level, and the nodes in the second level are parent nodes of the nodes in the third level,
wherein a particular node in the second level stores a regional name indicating a geographical area that is larger than the geographical area indicated by the regional name stored by the parent node of the particular node in the first level,
the geographical area indicated by the regional name stored in the particular node is larger than the geographical area indicated by the regional name stored in the child node of the particular node in the third level.

2. A geographical address retrieval system comprising:
a geographical address database associated with a postal addressing system, the geographical address database having a tree structure of nodes in which regional names, which constitute a geographical address, are stored in multiple levels of nodes, the multiple levels of nodes comprising:
a first level of nodes representing the regional names of first geographical areas,
a second level of nodes representing the regional names of second geographical areas, wherein each of the first geographical areas is a sub-division of one of the second geographical areas according to the postal addressing system, and
a third level of nodes representing the regional names of third geographical areas, wherein each of the third geographical areas is a sub-division of one of the first geographical areas according to the postal addressing system, wherein
the nodes in the first level are parent nodes of the nodes in the second level, and the nodes in the second level are parent nodes of the nodes in the third level,
a particular node in the second level stores a regional name indicating a geographical area that is larger tan the geographical area indicated by the regional name stored by a parent node of the particular node in the first level, and
the geographical area indicated by the regional name stored in the particular node is larger than the geographical area indicated by the regional name stored in the child node of the particular node in the third level;
an input portion that inputs a regional name;
a processor that searches the address database for a child node whose parent node has the regional name inputted by the input portion; and
an output portion that outputs the regional name corresponding to the child node retrieved by the processor.

3. A geographical address retrieval system according to claim 2, wherein
the address database further has characters indicating the readings of the heads of the regional names as the nodes of a top hierarchical level of the tree structure;
the input portion inputs a character indicating the reading of the head of the regional name of an objective geographic point;
the processor selects the regional names having the reading of the character, which is inputted by the input portion, from the top hierarchical level of the address database, and outputs the regional names to the output portion, and
the processor further searches the address database for a child node whose parent node has a regional name selected by the input portion from among the outputted regional names.

4. A geographical address retrieval system according to claim 2, wherein
the second geographical areas indicated by the regional names corresponding to the nodes of the second level are larger than the first geographical areas indicated by the regional names corresponding to the nodes of the first level; and
the third geographical areas indicated by the regional names corresponding to the nodes of the third level are smaller than the first geographical areas indicated by the regional names corresponding to the nodes of the first level, and smaller than the second geographical areas indicated by the regional names corresponding to the nodes of the second level.

5. A geographical address retrieval system according to claim 2, wherein the output portion adds attribute information of the regional name corresponding to the child node retrieved by the processor to the regional name, and outputs the regional name.

6. A geographical address retrieval system according to claim 2, further comprising a travel history collection means for collecting and accumulating the travel frequency of a region where a vehicle has traveled, wherein the output portion outputs regional names corresponding to the child nodes retrieved by the processor in the order of decreasing travel frequency of the region accumulated by the travel history collection means.

7. A geographical address retrieval system according to claim 2, further comprising a destination history collection means for collecting and accumulating the setting frequency of a region that is set as a destination, wherein the output portion outputs regional names corresponding to the child nodes retrieved by the processor in the order of decreasing setting frequency of the region accumulated by the destination history collection means.

8. A geographical address database embodied on a computer-readable medium for causing a computer to output data associated with a particular geographical address to a user, the database comprising:
nodes arranged in a hierarchical structure in which each node stores a name of a geographical region, such that the names of the geographical regions in the particular geographical address are stored in multiple levels of nodes within the hierarchical structure,
wherein the levels of nodes in the database include:
a first level of nodes representing the names of first geographical areas,
a second level of nodes representing the names of second geographical areas, wherein each of the first geographical areas is a sub-division of one of the second geographical areas according to the postal addressing system, and
a third level of nodes representing the regional names of third geographical areas, wherein each of the third geographical areas is a sub-division of one of the first geographical areas according to the postal addressing system,
wherein the levels of nodes are arranged in the database in such a manner that, for at least one set of parent and child nodes, the database includes a storage location for the parent node, a storage location for the child node, and a pointer between the storage locations of the parent and child nodes,
wherein a particular node in the second level stores the a name of a geographical area that is larger than and encompasses the geographical area whose name is stored in the parent node of the particular node in the first level, and
wherein the particular node stores the name of a geographical area region that is larger than and encompasses the geographical area region whose name is stored in the child node of the particular node in the third level.

9. A geographical address retrieval system comprising:
the database embodied on the computer-readable medium of claim 8;
an input device by which a user inputs a regional name;
a processor configured to:
search the database for a node that stores the inputted regional name is stored, and
determine a child node of the node that stores the inputted regional name; and
an output device for outputting the regional name stored in the child node.

10. An address retrieval system of claim 9, wherein
the database further has characters indicating the readings of the heads of the regional names as the nodes of a top level of the hierarchical structure;
the input device is configured for inputting a character indicating the reading of the head of the regional name of an objective geographic point;
the processor is configured for selecting the regional names having the reading of the character, which is inputted by the input portion, from the top hierarchical level of the address database, and outputs the regional names to the output portion, and
the processor is further configured for searching the geographical address database for a child node whose parent node has a regional name selected by the input device from among the outputted regional names.

11. An address retrieval system according to claim 9, wherein the second geographical areas indicated by the regional names stored in the nodes of the second level are larger than the first geographical areas indicated by the regional names stored in the nodes of the first level; and the third geographical areas indicated by the regional names stored in the nodes of the third hierarchical level are smaller than the first geographical areas indicated by the regional names stored in the nodes of the first level, and smaller than the second geographical areas indicated by the regional names stored in the nodes of the second hierarchical level.

12. An address retrieval system according to claim 9, wherein the output device adds attribute information of the regional name stored in the determined child node to the regional name, and outputs the regional name.

13. An address retrieval system according to claim 9, further comprising a travel history collection device for collecting and accumulating the travel frequency of a region where a vehicle has traveled, wherein the output device outputs regional names stored in a plurality of child nodes determined by the processor in the order of decreasing travel frequency of the region accumulated by the travel history collection device.

14. An address retrieval system according to claim 9, further comprising a destination history collection device for collecting and accumulating the selling frequency of a region that is set as a destination, wherein the output portion outputs regional names stored in a plurality of child nodes determined by the processor in the order of decreasing setting frequency of the region accumulated by the destination history collection device.

* * * * *